United States Patent [19]

King et al.

[11] Patent Number: 4,930,408
[45] Date of Patent: Jun. 5, 1990

[54] LARGE CAPACITY PRESSURE COOKER

[75] Inventors: James D. King, Dayton; Stephen D. Werts, Eaton, both of Ohio

[73] Assignee: Henny Penny Corporation, Eaton, Ohio

[21] Appl. No.: 283,571

[22] Filed: Dec. 13, 1988

[51] Int. Cl.⁵ ............................................. A47J 37/12
[52] U.S. Cl. .......................................... 99/407; 99/337; 99/408; 99/416
[58] Field of Search ................. 99/337, 403, 404, 407, 99/408, 410, 415, 416, 418

[56] References Cited

U.S. PATENT DOCUMENTS

| | | | |
|---|---|---|---|
| 1,264,740 | 4/1918 | Young | 99/408 |
| 2,125,862 | 8/1938 | Ratcliff | 99/408 |
| 2,772,626 | 12/1956 | Shaw | 99/403 |
| 3,194,662 | 7/1965 | Nelson | 99/403 |
| 3,280,722 | 10/1966 | Rahauser | 99/403 |
| 3,691,936 | 9/1972 | Chiarelli | 99/337 |
| 3,821,925 | 7/1974 | Moore | 99/407 |
| 4,768,426 | 9/1988 | Nett | 99/408 |

FOREIGN PATENT DOCUMENTS

887207 1/1962 United Kingdom ................. 99/404

Primary Examiner—Harvey C. Hornsby
Assistant Examiner—M. Spisich
Attorney, Agent, or Firm—Frost & Jacobs

[57] ABSTRACT

A large capacity pressure cooker in which an open-topped vat having an upper cooking zone and a lower cool zone for collecting contaminants is provided with a counterbalanced vertically moveable lid, operator-actuatable locking means having a single operating handle being provided to lock the lid in a closed and sealed position, including latching mechanism for maintaining the lid locking mechanism in the closed position when the vat is pressurized, the latching mechanism additionally serving to depressurize the vat if the latching mechanism is accidentally released.

18 Claims, 5 Drawing Sheets

LARGE CAPACITY PRESSURE COOKER

This invention relates to a pressure cooker, and more specifically, to a large capacity cooker of the type wherein the food being cooked, such as chicken parts, is immersed in a heated vat containing the cooking oil.

BACKGROUND OF THE INVENTION

Pressure cookers generally comprise a vat or cooking vessel of a size to receive a wire basket in which the product to be cooked is placed and then immersed in the cooking oil contained in the vat. The vat is closed by a lid which is sealed to the top of the vat, whereupon the product is cooked for the desired length of time under heat and pressure. Following the cooking cycle, the pressure in the vat is relieved and the lid opened, whereupon the product is removed from the wire basket, the customary practice being to transfer the cooked product to trays which are of a size to be received in a holding and/or display cabinet where the cooked product is retained under controlled conditions until served. Depending upon the size of the food service facility and/or the demand for the products, many facilities utilize banks of two, three or more conventional pressure cookers to meet the demand.

Efforts have hitherto been made to provide large capacity pressure cookers, including units having two or more cooking vats which may be used simultaneously. Such large capacity pressure cookers have met with limited acceptance due to their size, difficulties in operation and maintenance, as well as their complexity. These factors have made it impractical for the cookers to be operated by personnel lacking the size and physical strength to cope with the rigors of the manual operations required to operate the equipment. Efforts to mechanize the operation of the units, as by means of electro-mechanical or hydraulic controls for raising and lowering the lids of the vats, have produced more problems than they have solved, particularly insofar as maintenance problem and attendant down-time are concerned.

In contrast to the foregoing, the present invention provides a large capacity pressure cooker capable of handling, for example, ten heads of chicken, while at the same time providing a unit which may be easily operated by the average worker without undue physical exertion.

SUMMARY OF THE INVENTION

In accordance with the invention, the cooker comprises an essentially table-top height cabinet mounting an open top rectangular cooking vat of a size to receive a product carrier mounting a plurality of detachable trays stacked one above the other, the carrier being suspended from the lid of the vat. In an exemplary embodiment, the carrier mounts a series of five rectangular trays of a size to fit a conventional holding cabinet. With this arrangement, the trays are initially loaded with the product to be cooked, the trays being submersed in the cooking oil as the lid is closed and sealed. Following cooking, the trays are removed from the cooking oil as the lid is elevated, whereupon the trays may be removed from the carrier and placed directly in a holding cabinet or other storage racks without having to remove the product from the trays in which it is cooked.

In order to facilitate the raising and lowering of the lid, it is mounted on a pair of arms fixedly secured at their outer ends to a vertically moveable carriage mounted on vertically disposed guide rails projecting upwardly from the rear of the housing, the carriage being connected by a set of cables and pulleys to a counterbalancing weight which facilitate the raising and lowering of the lid. To this end, the lid is provided with a forwardly directed handle by means of which the lid may be readily raised and lowered by the operator with the assistance of the counterbalancing mechanism.

To ensure positive locking of the lid in the closed and sealed position, an operator-actuated locking mechanism is provided, the locking mechanism including a pair of locking arms having a handle extending between their forward ends positioned to be readily grasped by the operator when the lid is in the closed position, a simple upward and rearward movement of the handle serving to effect positive locking of the lid, whereupon the handle is lowered to a rest position. When it is desired to unlock the mechanism and release the lid, the operator may do so by a simple upward and forward movement of the locking handle which effectively disengages the locking mechanism.

In order to prevent accidental opening of the locking mechanism when the lid is closed and sealed and the vat is under pressure, a latch mechanism is provided which prevents accidental opening movement of the locking handle, the latch mechanism requiring positive release by the operator before the locking handle can be released. The latch mechanism is also provided with a safety mechanism which prevents pressurization of the vat unless the latch mechanism is in the latched position; and the latching mechanism additionally ensures against accidental release of the latching mechanism and possible opening of the lid while the vat is under pressure.

Preferably, the cooking vat of the present invention will be of a size to cook ten heads of chicken at a time, although the size and capacity of the vat does not constitute a limitation on the invention. It is also preferred that the vat have an upper cooking zone and a lower cool zone, the two zones being connected by a tapered annular wall surface which causes particles of food dropping from the carrier trays to be collected in the bottom of the vat, thereby effectively enhancing the useful life of the cooking oil. The cool zone in which the food particles are collected will preferably have the capacity to collect the cracklings and other droppings from a full day's cooker operation.

It will be understood that the cooker also will be provided with the usual controls for establishing the desired cooking cycles and for otherwise controlling the operation of the cooker.

DESCRIPTION OF THE PREFERRED EMBODIMENT

Figure 1:
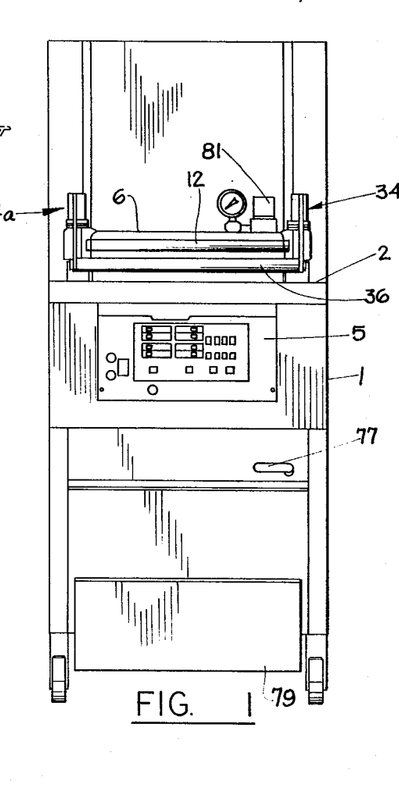
FIG. 1 is a front elevational view of a cooker in accordance with the invention.
Figure 2:
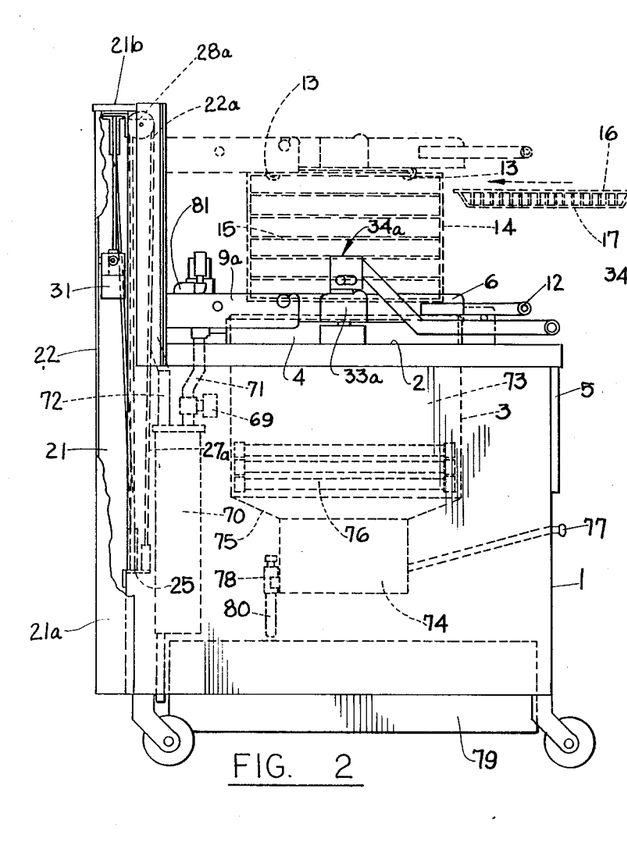
FIG. 2 is a side elevational view, with parts broken away and others shown in phantom, taken from the left side of FIG. 1.

Referring first to FIGS. 1 and 2 of the drawings, the cooker comprises a generally rectangular housing 1 having an essentially table-top height upper surface 2, the housing enclosing a rectangular cooking vat 3, the open top 4 of which projects upwardly above the upper surface 2 of housing 1. A control module 5 is mounted on the front wall of the housing 1 for controlling the various functions of the cooker.

The top 4 of the vat 3 is adapted to be closed by a lid 6, preferably formed from cast aluminum, the lid having perforated lugs 7 on its rear edge (best seen in FIG. 5) which are rotatably journaled on a rod 8, the opposite ends of which are received in mounting arms 9 and 9a the lugs 7 and rod 8 forming a hinge by means of which the lid 6 may be pivoted from a horizontal to a vertical position for cleaning purposes. The lid is normally maintained in the horizontal position by means of studs 10 which engage in upwardly opening slots 11 in the mounting arms 9,9a.

At its forward end, the lid 6 mounts a bail-shaped handle 12 by means of which the lid may be raised and lowered vertically relative to the vat 3 by means of the counterbalancing mechanism to be hereinafter described; or, in the alternative, the handle 12 may be used to pivot the lid to a vertical position for cleaning purposes.

On its under surface, as seen in FIG. 2, the lid 6 is provided with hangers 13 adapted to detachably receive a carrier 14 having longitudinally extending support rods 15 lying at vertically spaced apart intervals, the support rods 15 being positioned to receive the flanged side edges 16 of wire product trays 17. With this arrangement, the wire trays may be readily inserted in the carrier 14 and seated on the support rods 15 from the front of the cooker. In normal use, each of the trays will be filled with the product to be cooked and then inserted in the carrier. As previously mentioned, the wire trays 17 are of the same size as the trays normally used in a holding or display cabinet, and consequently, once the product has been cooked, the trays may be transferred directly from the cooker to the cabinet without disturbing the cooked product. The carrier itself may be readily removed from the lid for cleaning purposes, or when it is desired to clean the lid itself.

The Counterbalancing Mechanism

Figure 3:
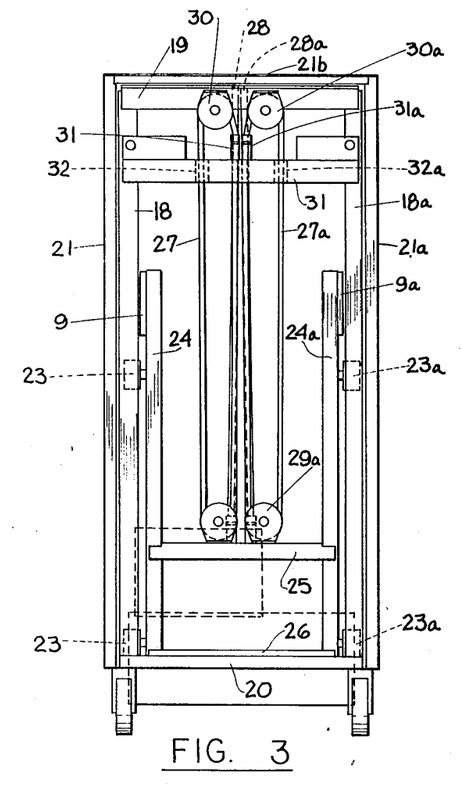
FIG. 3 is a rear elevational view of the cooker showing the carriage and counterbalancing mechanism when the lid is in the closed position.
Figure 4:
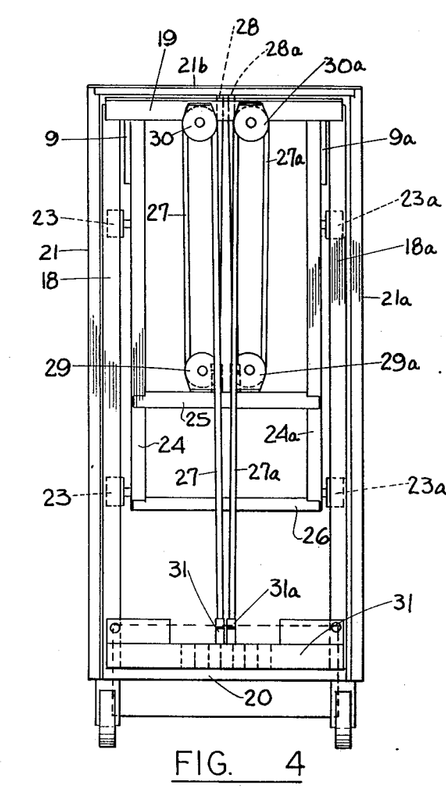
FIG. 4 is a rear elevational view similar to FIG. 3 showing the position of the carriage and counterbalancing mechanism when the lid is in its fully elevated position.

The raising and lowering of the lid is implemented by the counterbalancing mechanism as seen in FIGS. 3 and 4, and to this end, a supporting frame comprising an inwardly opening pair of U-shaped guide rails 18,18a is secured to the rear of the housing 1, the guide rails being interconnected by a top frame member 19 and a bottom frame member 20. The frame is covered by opposing side panels 21,21a, and a top cover panel 21b. As seen in FIG. 2, a rear cover panel 22 is also provided. The guide rails 18,18a are positioned to receive the sets of guide rollers 23,23a rotatably mounted on the side frame members 24,24a which, together with the cross members 25 and 26, define a carriage adapted to move longitudinally relative to the guide rails 18,18a. The rearmost ends of the mounting arms 9,9a are fixedly secured to the uppermost ends of the side frame members 24,24a, respectively, thereby mounting the lid 6 for vertical movement with the carriage.

In order to facilitate ease of operation, a pair of three-ply counterbalancing cables is provided. While only a single cable is required to produce the desired counterbalancing effect, a second cable is provided as a back-up, the second cable being in a trailing or non-loaded passive mode. The cables, indicated at 27,27a, are anchored at their innermost ends to cross member 25 forming a part of the moveable carriage (see also FIG. 2), the cables extending upwardly where they pass around a first pair of pulleys 28,28a mounted on top frame member 19, the cables then extending downwardly where they pass around a second pair of pulleys 29,29a mounted on the cross member 25 forming a part of the carriage, the cables then extending upwardly where they pass around a third pair of pulleys 30,30a which are also mounted on the top frame member 19 at right angles to the pulleys 28,28a, the distal ends of the cables being affixed at 30,30a to the counterweight 31, which, as best seen in FIG. 2, lies rearwardly of the U-shaped guide rails 22,22a. In order to facilitate free movement of the portions of the cables extending between the second and third sets of pulleys, i.e., between the pulleys 29,29a and 30,30a, the counterweight 31 is recessed at 32,32a to receive the respective pulleys. The counterweight 31 will be chosen so as to effectively counterbalance the weight of the lid 6 so that the force required to raise and lower the lid is reduced to an easily manageable level. The three-ply cable illustrated provides a 3–1 ratio.

As previously indicated, one of the cables is active and the other is passive. Thus, the cable 27 may comprise the active cable and will bear the full weight of the lid 6, the carriage and the counterweight. The cable 27a, on the other hand, will be slightly longer than the cable 27 and hence will be in a trailing or non-loaded passive mode, its purpose being to serve as a back-up in the event of a malfunction in the cable 27 and/or its related pulleys.

Lid Locking Mechanism

In order to seal the lid 6 to the open top 4 of the vat 3, the lid 6 is provided on its opposite sides with an opposing pair of slotted locking ears 33,33a, seen in FIGS. 5–8. The locking ears project forwardly and are adapted to receive an opposing pair of locking members, indicated generally at 34,34a, the locking members having forwardly projecting locking arms 35,35a interconnected at their outermost ends by a handle 36, the handle 36 extending outwardly beyond the handle 12 for the lid 6.

Figures 9, 10:
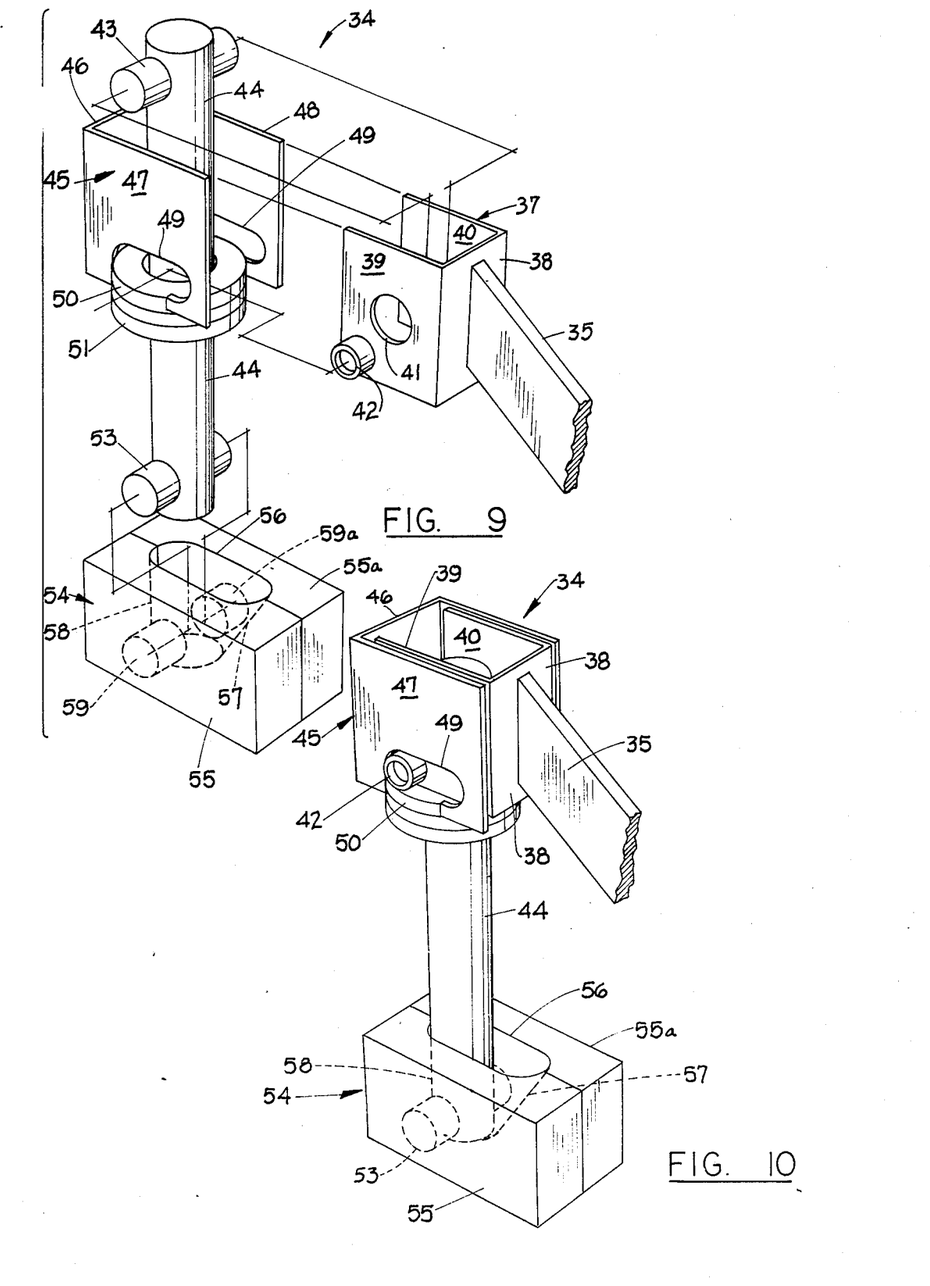
FIG. 9 is an enlarged, exploded perspective view illustrating the details of the locking mechanism.
FIG. 10 is an enlarged, perspective view showing the locking mechanism of FIG. 9 in the fully assembled position.

Details of the construction of the locking members 34,34a are shown in FIGS. 9 and 10, it being understood that the two locking members are identical to each other, and consequently only the locking member 34 will be described.

The locking arm 35 mounts at its inner end a U-shaped bracket indicated generally at 37, the bracket having an end wall 38 and opposing side walls 39 and 40, each of the side walls being provided with a pin-receiving opening 41 and a cam roller 42 mounted adjacent its lowermost forward corner. The pin-receiving openings 41 are adapted to receive and rotatably journal the opposite ends of a transverse pin 43 extending through the upper end of locking shaft 44 when the U-shaped bracket 37 is fitted within the opposing U-shaped bracket 45, the opposing U-shaped bracket 45 having an end wall 46 and a pair of opposing side walls 47 and 48. The side walls 47 and 48 each has an elongated slot 49 at its lowermost edge, the slots 49 being partially cut away so as to seat on a collar 50 which is welded to the U-shaped bracket 45, the collar 50 being of a size to slidably receive the locking shaft 44. When in the assembled position, the cam rollers 42 engage in the slots 49 and seat on the collar 50, in the manner seen in FIG. 9.

Figure 11:
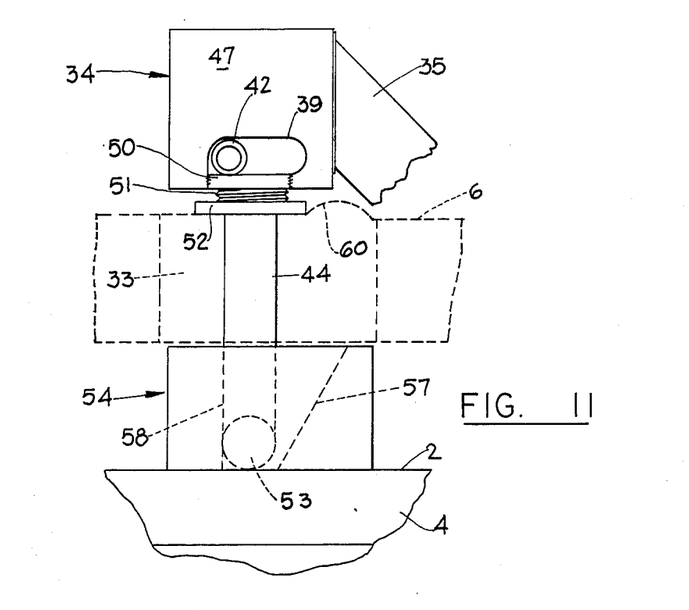
FIG. 11 is an enlarged, fragmentary elevational view showing additional details of the locking mechanism.

As best seen in FIG. 11, the collar 50 has a downwardly projecting threaded sleeve 51 on which is threaded an adjustment ring 52 through which the locking shaft 44 also freely passes.

At its lowermost end, the locking shaft 44 mounts a cross pin 53, the opposite ends of which are adapted to be received in a mounting block, generally indicated at 54. The mounting block is adapted to be mounted on the upper surface 2 of the housing 1 underlying the ear 33. The mounting block is composed of opposing parts 55,55a which are adapted to be secured together and to the upper surface of the housing after they have been assembled with the locking shaft 44 and cross pin 53. To this end, the opposing parts 55,55a define an elongated cavity 56 having a tapered forward end 57 and a vertical rear end 58. Each of the parts 55,55a has a transverse bore, indicated at 59,59a, adapted to rotatably journal the opposite ends of the cross pin 53, thereby pivotally mounting the lower end of the locking shaft 44 in the mounting block 54 when the parts are assembled.

Figure 7:
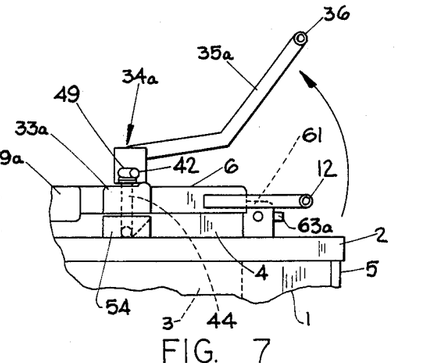
FIG. 7 is a fragmentary side elevational view similar to FIG. 6 showing the handle of the locking mechanism in the elevated position.
Figure 8:
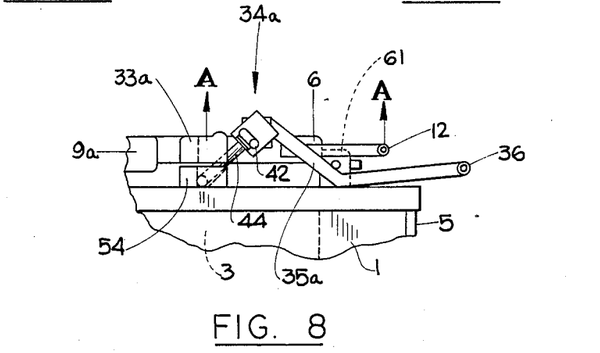
FIG. 8 is a fragmentary side elevational view similar to FIG. 7 showing the locking mechanism in the fully open position.

Referring next to FIG. 8, which shows the locking mechanism in the unlocked position, it will be seen that the locking shaft 44 is tilted forwardly and the locking member 34 is free from engagement with the slotted locking ear 33. When in this position, the lid 6 may be lifted upwardly, as indicated by the arrows A, by means of the handle 12 and the counterbalancing mechanism previously described. When it is desired to lock and seal the lid against the upper end 4 of the vat 3, the operator will lift the handle 36 to the position illustrated in FIG. 7, such movement causes the locking member 34 to move to a position overlying the ear 33, the locking shaft 44 moving from the inclined position seen in FIG. 8 to the upright position seen in FIG. 7. It will be noted that when the locking member is moved to the position shown in FIG. 7, the cam roller 42 lies at the forward end of the elongated slot 49, whereupon continued inward movement of the locking member 34 and downward movement of the handle 36 will bring the locking member to the condition illustrated in FIG. 6, in which it will be seen that the cam roller 42 has shifted its position to the opposite end of the slot 49 in which position it lies beyond the dead center of the shaft 44. As best seen in FIG. 11, this movement effectively causes the adjustment ring 52 to press downwardly against the upper surface of the locking ear 33, thereby effectively clamping the lid 6 against the top of the vat. In this connection, the sealing pressure exerted on the ear 33 and hence on the lid 6 can be effectively varied by adjusting the position of the adjustment ring 52 which, as it is moved downwardly relative to the collar 50, will exert increased pressure on the locking ear and lid.

It also will be noted in FIG. 11 that the ear 33 is provided with a shoulder 60 which effectively acts as a stop to prevent possible outward movement of the locking member once the adjustment ring 52 has been seated on the ear and clamped in place.

When it is desired to unlock the lid 6, the arm 32 is lifted upwardly, thereby causing the cam rollers 42 to resume the position seen in FIG. 7, thereby permitting the locking member 34 to be moved forwardly so that it resumes the position shown in FIG. 8.

The Safety Latch

In order to ensure that the locking members 34,34a will not be accidentally released while the vat is under pressure, a safety latching mechanism is provided which prevents the handle 36 from being lifted when a cooking cycle is in progress and the vat is under pressure. In addition, the latching mechanism is constructed so that the vat will remain vented and hence incapable of being pressurized unless and until the latching mechanism is in its operative position.

Figure 5:
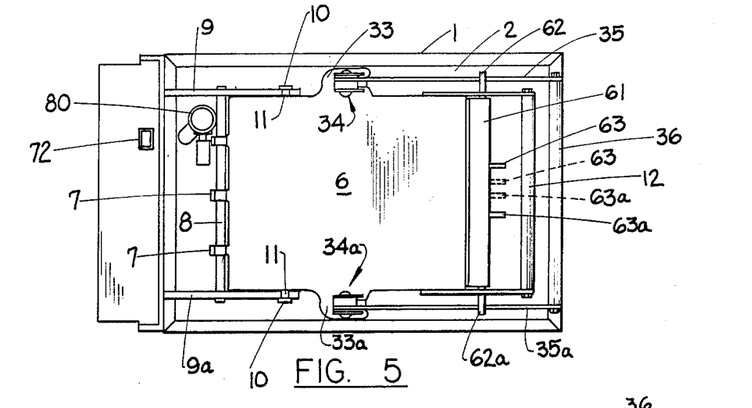
FIG. 5 is a top plan view of the cooker showing the lid and the associated locking and latching mechanisms.
Figure 6:
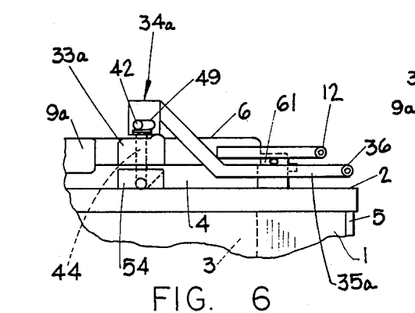
FIG. 6 is a fragmentary side elevational view showing the lid and locking mechanism in the fully locked position.

Referring now to FIG. 5, the latching mechanism is mounted within a housing 61 lying at the forward end of the vat 3, the latching mechanism having latching pins 62,62a projecting outwardly from its opposite ends which, when extended are adapted to overlie the locking arms 35,35a, respectively, thereby preventing the locking arms and the handle 36 from being raised. The latching pins 62,62a are adapted to be actuated by the latch fingers 63,63a at their respective inner ends which are moveable from the latched position shown in solid lines to the unlatched position shown in dotted lines.

Figure 12:
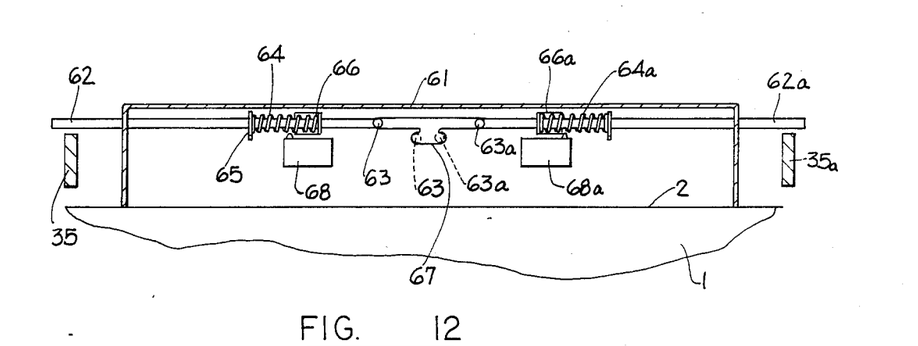
FIG. 12 is an enlarged, vertical sectional view illustrating the latching mechanism for preventing accidental disengagement of the locking mechanism.

The operation of the latching mechanism can be best understood by reference to FIG. 12 wherein it will be seen that each of the latching pins is bias to its extended position by means of springs 64,64a, respectively, which surround the latch pins and extend between the collars 65,65a secured to the latch pins and sleeves 66,66a which freely surround the latch pins and are fixedly secured to the housing 61. With this arrangement, the latch pins 62,62a may be deflected inwardly against the compression of their respective springs and locked in the retracted position by the engagement of the latch fingers 63,63a in the slot 67. When so engaged, the free ends of the latch pins 62,62a are displaced inwardly so as to permit upward movement of the locking arms 35,35a.

In order to ensure that the latching pins are in their extended positions during operation of the cooker, microswitches 68,68a are positioned to be actuated when the locking pins 62,62a are in their retracted position. The microswitches 68,68a are operatively connected to the solenoid valve of a pressure relief device, indicated at 69 in FIG. 2, the actuation of either of the microswitches 68,68a serving to open the pressure relief valve 69 and hence vent the pressure in the vat 3. Thus, if an attempt is made to disengage either of the latching pins 62,62a during the cooking cycle, the pressure relief valve 69 will be opened and the vat will be vented to condensation tank 70 through conduit 71, the condensation tank being vented to the outside air through vent conduit 72. Alternatively, the microswitches may be connected to a warning light circuit forming a part of the control module 5, which will give a visual and/or audible warning if the latching pins are retracted, as well as open the opening of the pressure relief valve 69.

In the event the latching pins are not in the latched position at the start of a cooking cycle, the microswitches may be connected to a warning light on the control module indicating that the latching pins are not in their operative position, and the microswitches also can be utilized to maintain the pressure relief valve 69 in the open position, thereby preventing the buildup of pressure in the cooking vat unless and until the locking mechanism has been properly latched.

The Cooking Vat

In order to optimize the utilization of the cooking oil and permit all-day operation without undue contamination of the cooking oil, the cooking vat 3, as seen in FIG. 2, is divided into an upper cooking zone 73 and a lower cool zone 74, the zones being interconnected by the tapered annular wall 75. The cool zone is substantially smaller than the cooking zone and preferably comprises from 20–30% of the volume of the vat. Heating elements 76 line the walls of the vat in the lower portion of the heating zone to heat the cooking oil to the desired cooking temperature.

The heated cooking oil in the cooking zone will circulate within the cooking zone and in so doing will cause cracklings and other fall-off from the product being cooked to slide-off the tapered annular wall 75 for deposit in the cool zone 74, which remains essentially quiescent. With this arrangement, the cooking oil in the cooking zone remains essentially free from contaminants. Preferably, the tapered annular wall 75 will have an angle of inclination from the horizontal of from 22°–26°, which has been found to effectively displace contaminants from the tapered wall surfaces while maintaining the cool zone in essentially quiescent condition and at a substantially lower temperature than the temperature of the oil in the cooking zone, thereby minimizing the cooking of the cracklings and other contaminants which, if they continued to cook, would further contaminate the cooking oil.

When it is desired to remove the collected contaminants and replace the cooking oil, the operator actuates handle 77 at the front of the cooker, which causes discharge valve 78 to open, thereby discharging the contents of the vat into the underlying collection tank 79 through discharge conduit 80. In order to prevent accidental opening of the discharge valve 78 when the vat is under pressure, locking mechanism of known character may be utilized to prevent the discharge valve from being opened unless the vat is vented.

As will now be evident, the present invention provides a large capacity pressure cooker which nonetheless is easy to manually operate, and which is provided with numerous safety features to ensure safe and efficient operation. In addition to the safety features discussed above, the cooker may be provided with other conventional safety features, such as the dead-weight valve 81 seen in FIGS. 1, 2 and 5 which will vent the vat if a predetermined pressure is exceeded; and a separate solenoid valve may be provided in conduit 71 to release the pressure in the vat at the end of the cooking cycle, such valve being operated by the control module 5.

What is claimed is:

1. A pressure cooker comprising a housing mounting an open top vat for receiving cooking oil,
   a horizontally disposed lid for closing and sealing the top of the vat,
   a pair of vertically extending guide rails at the rear of said housing, a carriage movably mounted on said guide rails, a pair of mounting arms engaging the opposite sides of said lid, said mounting arms being secured to said carriage for movement therewith, counterbalancing mean associated with said carriage to assist in moving the said lid vertically from an open position in which it is elevated relative to said vat to a closed position in which said lid is seated on the top of said vat,
   carrier means for product to be cooked mounted on the underside of said lid and positioned to enter said vat as said lid is moved to the closed position, and
   locking means mounted on said housing and positioned to engage said lid when in its closed position, said locking means including a handle for moving said locking means from an inoperative position in which said lid is free to be opened and closed to an operative position in which said locking means engages and seals said lid against the top of said vat, and releasable latch means operative to secure said handle against movement when said locking means is in its operative position.

2. The pressure cooker claimed in claim 1 wherein said counterbalancing means comprises a cable secured at one end to said carriage and at its opposite end to a counterweight, said cable passing around at least a first pulley fixedly secured relative to said guide rails.

3. The pressure cooker claimed in claim 2 wherein said cable also passes around a second pulley mounted on said carriage and a third pulley fixedly secured relative to said guide rails.

4. The pressure cooker claimed in claim 2 wherein said counterbalancing means include a second cable and pulley corresponding to said first-named cable and pulley, and wherein one of said cables is active and the other passive, said passive cable serving as a back-up in the event of failure of said active cable.

5. The pressure cooker claimed in claim 1 including a pair of locking ears fixedly secured to the opposite sides of said lid, said locking means comprising a pair of locking members mounted on said housing on opposite sides of said lid and engageable with said locking ears, said handle being operatively connected to each of said locking members.

6. The pressure cooker claimed in claim 5 wherein said locking ears are slotted and wherein each of said locking members comprises a locking shaft pivotally connected at one end to said housing and operatively connected at its opposite end to said handle, said locking shafts being engageable with said slotted locking ears when said locking members are in the operative position.

7. The pressure cooker claimed in claim 6 wherein each of said locking shafts includes a locking collar, wherein each of said locking shafts is pivotally connected at its opposite end to a first bracket operatively connected to said handle for movement therewith, and wherein each of said brackets mounts at least one cam roller engageable with one of said locking collars.

8. The pressure cooker claimed in claim 7 wherein each of said locking collars mounts a second bracket adapted to mate with the first bracket, said second brackets each having at least one elongated slot therein positioned to receive the cam roller mounted on the corresponding first bracket, each of said slots being positioned to permit the corresponding cam roller to move from a first position in which it lies on one side of the longitudinal axis of the corresponding locking shaft to a position in which the cam roller lies on the opposite side of the longitudinal axis of the corresponding cam shaft.

9. The pressure cooker claimed in claim 8 wherein each of said locking shafts mounts an adjustment ring engageable with the corresponding locking ear on said lid.

10. The pressure cooker claimed in claim 9 wherein each of said first brackets is operatively connected to said handle by means of an elongated locking arm.

11. The pressure cooker claimed in claim 1 including elongated locking arms connecting said handle to said locking means, and wherein said latching means comprises displaceable latching pins engageable with said locking arms.

12. The pressure cooker claimed in claim 11 including resilient means normally biasing said latching pins to their locking arm engaging positions, and means for displacing said latching pins to disengage said locking arms.

13. The pressure cooker claimed in claim 12 including means operative to vent said pot when at least one of said latching pins is displaced from its locking arm engaging position.

14. The pressure cooker claimed in claim 1 wherein said cooking vat has an upper cooking zone and a lower cool zone having cross-sectional dimensions smaller than said cooking zone, said zones being interconnected by a tapered annular wall, heating elements in said cooking zone, and a drain at the bottom of said cool zone.

15. The pressure cooker claimed in claim 14 wherein said cool zone comprises 20-30% of the volume of said vat, and wherein said annular tapered wall is inclined downwardly at an angle of from 20°-26° from the horizontal.

16. The pressure cooker claimed in claim 1 wherein said carrier means comprises an opposing pair of hangers adapted to be detachably connected to the undersurface of said lid, said hangers mounting pairs of longitudinal support rods lying in vertically spaced apart relation, each of said pairs of support rods being adapted to receive a product tray, said hangers and support rods being dimensioned to receive product trays of a size which may be inserted in a product holding cabinet.

17. A pressure cooker comprising a housing mounting an open top vat for cooking oil, heating means for heating said vat,
 a lid for closing and sealing the top of said vat, means mounting said lid for vertical movement relative to said vat and for pivotal movement relative to said mounting means, said lid being moveable vertically between an open position in which said lid is elevated relative to said vat to a closed position in which said lid is seated on the top of said vat,
 carrier means for product to be cooked operatively connected to said lid for movement therewith, and
 locking means engageable with the opposite sides of said lid when in its closed position, a pair of locking arms projecting forwardly from the locking means on the opposite sides of said lid, said locking arms being interconnected by a handle by means of which said locking means may be actuated, and
 releasable latching means operative to secure said locking means against accidental disengagement.

18. A pressure cooker comprising a housing mounting an open top vat for cooking oil, heating means for heating said vat,
 a lid for closing and sealing the top of said vat, means mounting said lid for vertical movement relative to said vat and for pivotal movement relative to said mounting means, said lid being movable vertically between an open position in which said lid is elevated relative to said vat to a closed position in which said lid is seated on the top of said vat,
 locking means engageable with the opposite sides of said lid when in its closed position, a pair of locking arms projecting forwardly from the locking means on the opposite side of said lid, said locking arms being interconnected by a handle by means of which said locking means may be actuated, and
 releasable latching means operative to secure said locking means against accidental disengagement.

* * * * *